(No Model.)
S. & T. FORBES.
TIRE TIGHTENER.
No. 567,782. Patented Sept. 15, 1896.
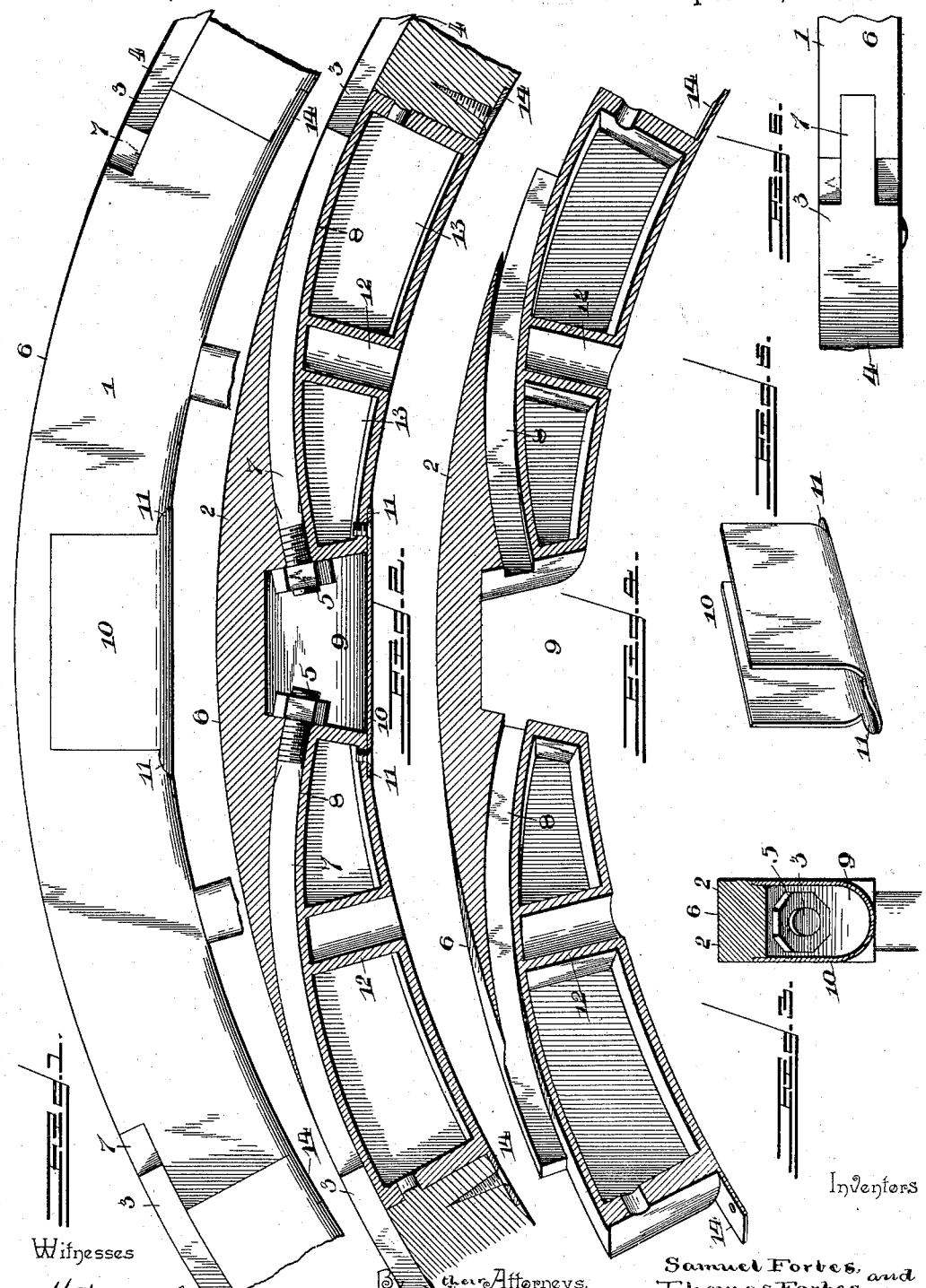
Witnesses
Inventors
Samuel Forbes, and
Thomas Forbes,

UNITED STATES PATENT OFFICE.

SAMUEL FORBES AND THOMAS FORBES, OF DODGEVILLE, WISCONSIN.

TIRE-TIGHTENER.

SPECIFICATION forming part of Letters Patent No. 567,782, dated September 15, 1896.

Application filed December 26, 1895. Serial No. 573,329. (No model.)

*To all whom it may concern:*

Be it known that we, SAMUEL FORBES and THOMAS FORBES, citizens of the United States, residing at Dodgeville, in the county of Iowa and State of Wisconsin, have invented a new and useful Tire-Tightener, of which the following is a specification.

The invention relates to improvements in tire-tighteners.

The object of the present invention is to provide simple and effective means whereby a tire may be readily tightened and properly adjusted to the felly of a wheel without necessitating heating or upsetting the tire and without employing a blacksmith or other skilled mechanic.

The invention consists in the novel combination and arrangement of parts hereinafter fully described, illustrated in the accompanying drawings, and pointed out in the claims hereto appended.

In the drawings, Figure 1 is an elevation of a portion of a wheel provided with a tire-tightener constructed in accordance with this invention. Fig. 2 is a longitudinal sectional view of the same. Fig. 3 is a transverse sectional view. Fig. 4 is a detail sectional view of the felly-section. Fig. 5 is a detail perspective view of the clip. Fig. 6 is a detail view of one end of the felly-section and the adjacent portion of the tire.

Like numerals of reference designate corresponding parts in all the figures of the drawings.

1 designates a felly-section, designed to be constructed of suitable metal, receiving the terminals 3 of a tire 4, and the latter has its ends threaded and provided with nuts 5, which are adapted to be adjusted independently of each other, and which are capable of tightening the tire to the desired degree. The felly-section 1 is adapted to be employed in connection with felly-sections of the ordinary construction, and it is provided with a curved outer edge 6, adapted to form a portion of the tread of the wheel at the terminals of the tire.

The terminals of the tire are provided with curved shanks or extensions 7, rectangular in cross-section and arranged in curved ways or openings 8 of the felly-sections 1, and the latter is provided with a central recess or opening 9 for the reception of the nuts 5. The curved ways or openings communicate at their inner ends with the central opening or recess, and a U-shaped clip 10 extends over the central opening 9 and conceals the nuts 5 and prevents the threads of the terminals of the tire from becoming clogged with dust or other accumulation. This clip is secured to the felly-section 1 by suitable fastening devices passing through perforated ears or extensions 11 at the inner edge of the felly-section at opposite sides of the opening thereof.

The terminals of the felly-sections 1 are recessed at their outer edges a sufficient distance to provide for ample adjustment of the ends of the tire, and it is also provided with spoke-sockets 12, and may have recesses or open portions 13 for decreasing its weight.

The felly-section 1 is provided at its ends with straight radial faces to abut against the adjacent ends of the wooden fellies of a wheel, and it is provided at the inner edges of its ends with projections 14, which are adapted to overlap the adjacent ends of the contiguous felly-sections of the wheel.

It will be seen that the tire-tightener is exceedingly inexpensive in construction, that it is adapted to be readily applied to vehicle-wheels, and that it is capable of enabling a tire to be rapidly tightened and properly adjusted without necessitating a blacksmith or a wheelwright or other skilled mechanic.

Changes in the form, proportion, and minor details of construction may be resorted to without departing from the principle or sacrificing any of the advantages of the invention.

What we claim is—

1. In a wheel, the combination of a metallic felly-section forming a portion of the tread of the wheel, provided at its ends with straight radial faces to abut against the ends of the contiguous felly-sections, and having longitudinal grooves or ways, said metallic felly-section being provided with a central opening communicating with the inner ends of the longitudinal ways, a tire provided at its terminals with shanks or extensions fitting in said ways, and nuts arranged within the opening of the felly-section, arranged on the threaded shanks or extensions and capable of independent adjustment, substantially as described.

2. In a wheel, the combination of a metallic felly-section forming a portion of the tread of the wheel, provided intermediate of its ends with an opening and having longitudinal ways communicating with the opening, said metallic felly-section being provided with spoke-sockets and provided at its ends with radially-disposed abutting faces and with projections 14 adapted to overlap the adjacent felly-sections, a tire provided with shanks or extensions arranged in said ways and threaded, nuts engaging the threaded shanks or extensions and capable of independent adjustment, and a substantially U-shaped clip detachably secured to the center of the metallic felly-section and covering the opening thereof, substantially as described.

In testimony that we claim the foregoing as our own we have hereto affixed our signatures in the presence of two witnesses.

SAMUEL FORBES.
THOMAS FORBES.

Witnesses:
J. THD. PRYOR, Jr.,
A. L. ROBBINS.